Oct. 19, 1965

M. B. HOLLANDER 3,212,182

FRICTION WELDING

Filed May 24, 1962

INVENTOR
MILTON BERNARD HOLLANDER

Oct. 19, 1965  M. B. HOLLANDER  3,212,182
FRICTION WELDING
Filed May 24, 1962  3 Sheets-Sheet 2

INVENTOR
MILTON BERNARD HOLLANDER

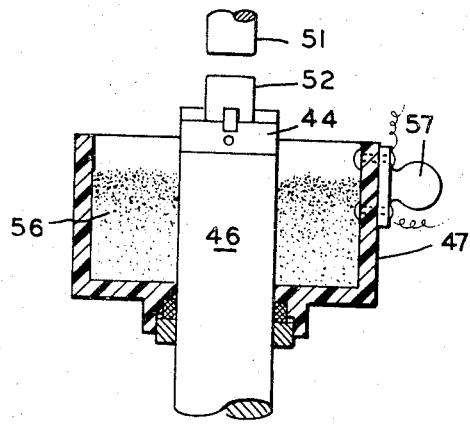
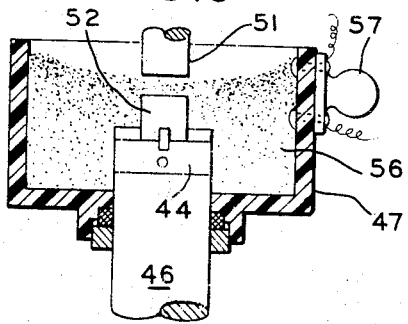
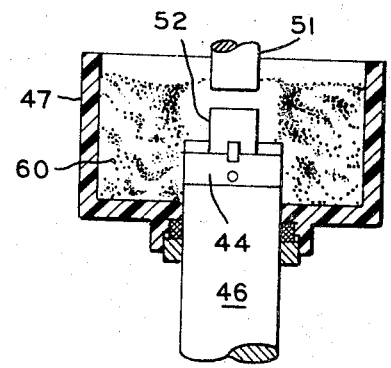
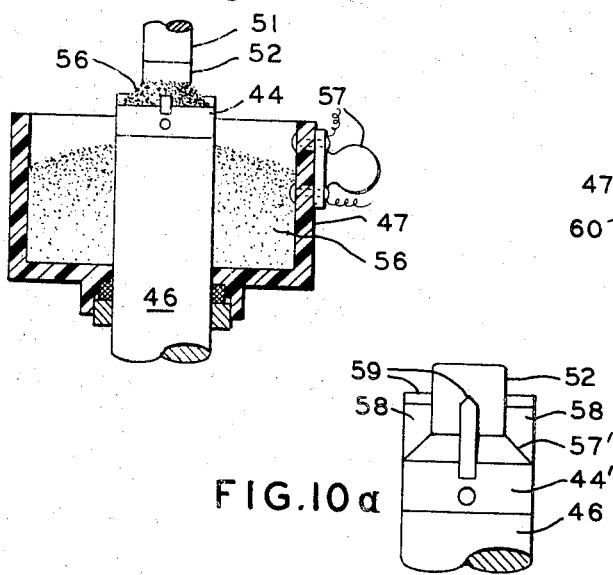
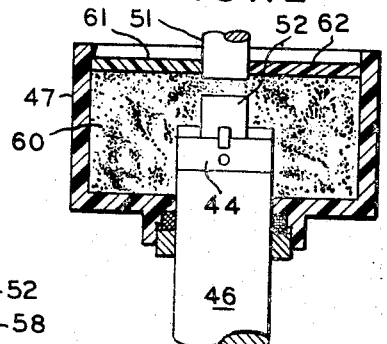

3,212,182
FRICTION WELDING
Milton Bernard Hollander, Stamford, Conn., assignor to American Machine & Foundry Company, a corporation of New Jersey
Filed May 24, 1962, Ser. No. 197,536
12 Claims. (Cl. 29—470.3)

This invention relates in general to friction welding processes and apparatus, and, more particularly, to a friction welding process and apparatus for friction welding metal workpieces submerged in a fluxing agent.

In any welding operation, a fluxing agent may accomplish two general purposes. First, it may protect the workpieces being welded from contamination, generally oxidation, and, secondly, it may clean impurities from the weld area of the workpieces to be welded.

In general, a flux protects the metal from oxidation, dissolves oxides and improves the fluidity of the molten metal. A flux is used to prevent the formation of scale on some metals to be forge welded. When fluxes are sprinkled on the heated surfaces, a protective coating is formed which prevents further oxidation of the base metals. Molten flux aids in the dissolving of oxides by combining with the oxide and lowering its melting point. Two fluxes commonly used on steels are silica sand and borax, or sodium tetraborate. Wrought iron and very low carbon steels do not require the application of fluxes. With these steels, it is possible to melt the oxides without burning or melting the base metal.

Borax is a flux employed in the friction welding of high-carbon steels. This flux has a comparatively low fusion point. It may be sprinkled on steel at low temperature or while it is in the process of heating. The melting point of the oxide is lowered, and further oxidation of the plate is prevented.

Silica sand is more easily obtainable than borax and is suitable for use as a flux in the friction welding of low-carbon steel. Sand has a high melting point. When it is combined with iron oxide, its fusion point is reduced, as is the fusion point of the oxide.

It is, therefore, an object of this invention to provide a friction welding process using a fluxing agent.

Another object of this invention is to provide a friction welding process wherein workpieces of metal are friction welded while submerged within a fluxing agent.

A further object of this invention is to provide a friction welding apparatus for friction welding workpieces while submerging the weld area between the workpieces in a fluxing agent.

Yet another object of this invention is to provide a friction welding apparatus which enables workpieces to be easily and rapidly friction welded with a high rate of production while the workpieces are submerged in a fluxing agent.

Many other objects, advantages and features of invention reside in the construction, arrangement and combination of parts involved in the invention and its practice as will be understood from the following description and accompanying drawing wherein:

FIGURES 8, 9 and 10 are vertical sections through a container containing a powdered fluxing agent with fragments of associated elements of the friction welding apparatus shown positioned, respectively, prior to friction welding, with the workpieces submerged in a powdered fluxing agent, and after the workpieces are friction welded;

FIGURE 10a is a side view of a special chuck mounted on a fragment of a friction welding apparatus; and FIGURES 11 and 12 are vertical sections through a container containing a paste fluxing agent with fragments of associated elements of the friction welding apparatus shown positioned, respectively, prior to friction welding with the level of the paste flux raised above the workpieces and with the paste flux being forced against the workpieces.

Figure 1:
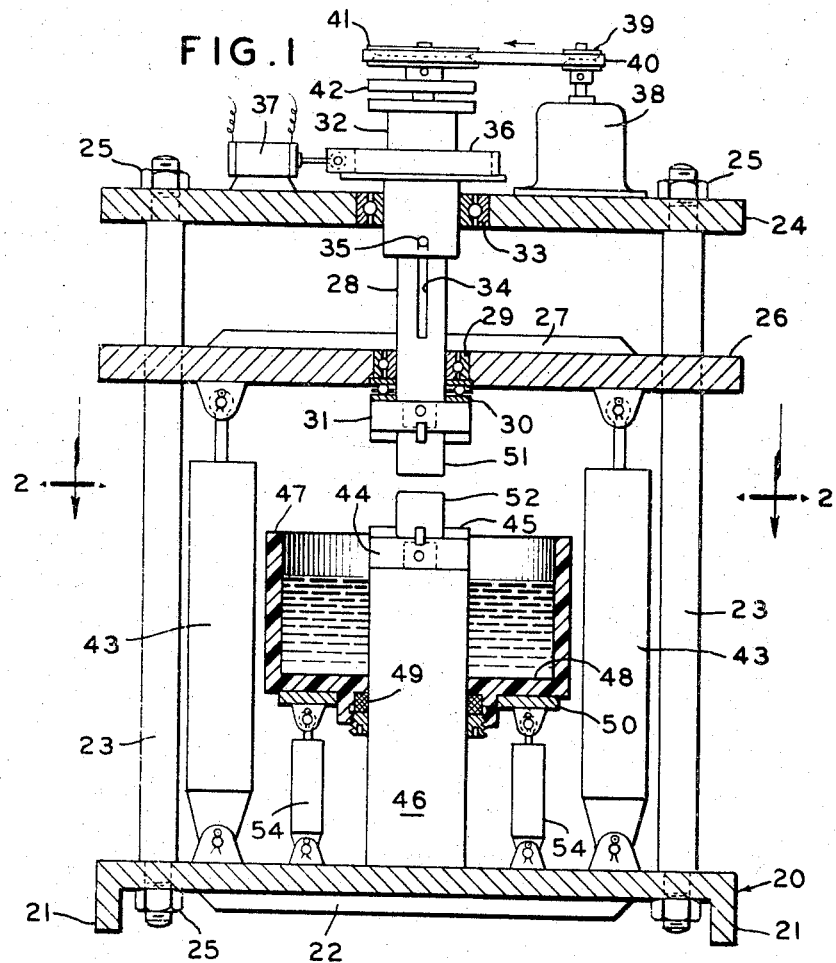
FIGURE 1 is a vertical section through a friction welding machine for welding workpieces while they are submerged in a fluxing agent.
Figure 2:
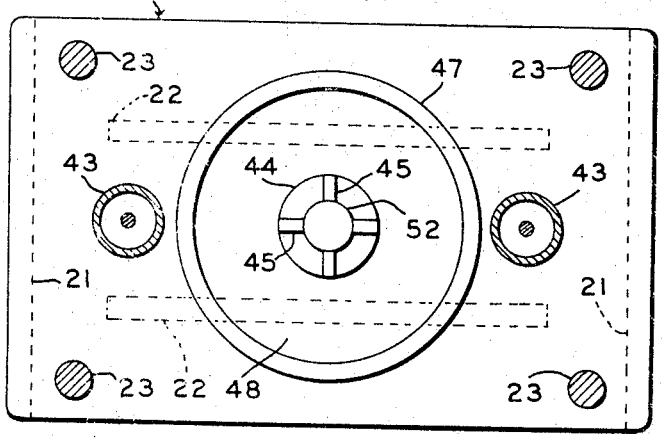
FIGURE 2 is a horizontal section taken on line 2—2 of FIGURE 1.

Referring to the drawing in detail, FIGURES 1 and 2 shown a vertical friction welding apparatus having a base 20 which rests on the side flanges 21 and has the reinforcing ribs 22 cast integrally with it. Extending upward from the base 20 are four support and guide rods 23. An upper plate 24 is positioned and fixed above the base 20 by the guide rods 23 which are secured by the nuts 25.

A slide member 26 is slidably mounted about the guide rods 23 and has reinforcing ribs 27 formed integrally with it. A shaft 28 extends through the center of the slide member 26 and is rotatably supported by the ball bearing 29. A suitable chuck 31 is fixed to the lower end of shaft 28 and is positioned below slide member 26 by the thrust bearing 30. A hollow shaft 32 extends downward through the upper plate 24 and is rotatably supported by the ball bearing 33. Shaft 28 extends slidably within the hollow shaft 32 and is locked to it to rotate with it by a suitable means such as the keyway 34 and the pins 35 which extend into keyway 34. A brake 36 is mounted about shaft 32 so that it may be activated by a suitable unit 37 to stop rapidly any rotation of shafts 32 and 28. An electric motor 38 drives pulley 41 through pulley 39 and belt 40. Pulley 41 is rotatably mounted on the upper end of shaft 32 and drives shaft 32 by a clutch 42 which may be disengaged.

Large hydraulic cylinders 43 are mounted to extend between the base 20 and the slide member 26 so that the cylinders 43 can draw the slide member 26 downward and thereby move the chuck 31 downward. A lower chuck 44 having the jaws 45 is fixed on the top of a cylindrical chuck support 46 which is fixed rigidly to base 20. Extending about the chuck support 46 is a flux container 47. Where the bottom wall 48 of the flux container 47 surrounds and contacts chuck support 46, a suitable liquid tight seal 49 may be placed. The flux container 47 rests upon a metal base ring 50. Suitable hydraulic cylinders 54 are connected between the base 20 and the base ring 50 so that the cylinders 54 may be activated to raise and lower container 47 about the chuck support 46.

Figure 3:
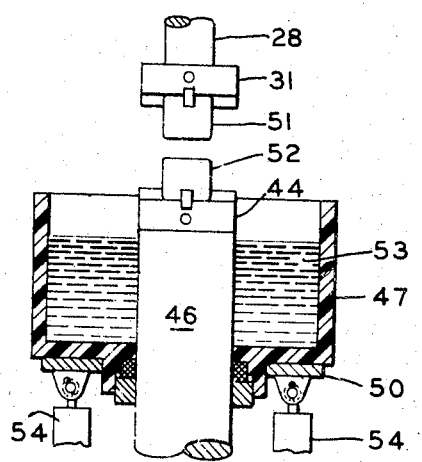
FIGURES 3, 4, 5 and 6 are vertical sections through a liquid flux container with fragments of associated elements of the friction welding apparatus shown positioned, respectively, prior to friction welding, submerging the workpieces in a liquid fluxing agent, friction welding the workpieces, and after friction welding.

Referring also to FIGURES 3, 4, 5 and 6, this apparatus is used in the following manner to friction weld workpieces submerged in a fluxing agent. As shown in FIGURE 3, the cylinders 54 are retracted so that the flux container 47 is slid into its lowermost position about the chuck support 46. A suitable liquid fluxing agent is poured into the flux container 47 and the workpieces 51 and 52 are fixed in the chucks 31 and 44. When the container is in a lowered position, the chuck 44 is easily reached to insert a workpiece 52 manually and tighten it. In this lowered position of the container 47, the level of the fluid 53 is below both the workpiece 52 and the chuck 44.

Figure 4:
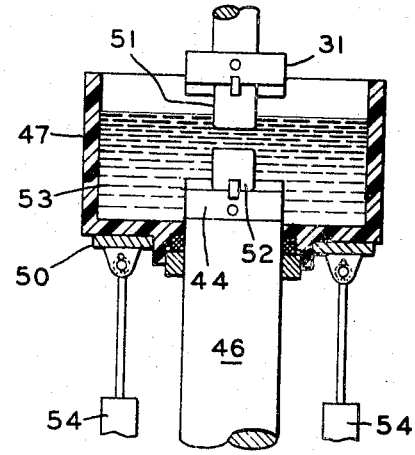

Referring now to FIGURE 4, the cylinders 54 are activated to raise the flux container 47 about the chuck support 46 to submerge the chuck 44, the workpiece 52, and the lower portion of workpiece 51.

Figure 5:
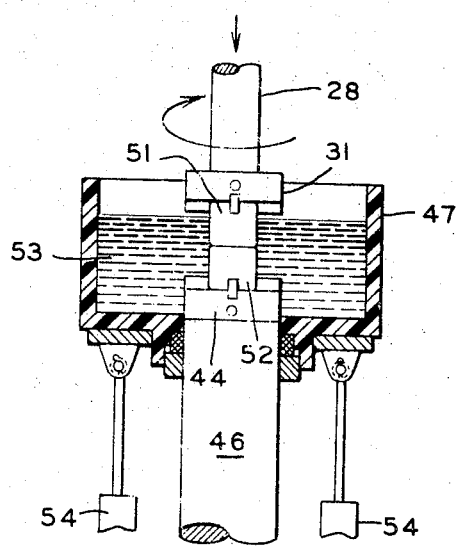

As shown in FIGURE 5, the workpieces 51 and 52 are friction welded by rapidly rotating workpiece 51 while forcing it against the top of workpiece 52 until frictional heat developed in the contact or weld area renders the metal of the workpieces plastic in the weld area whereon the rotation of workpiece 51 is rapidly stopped and it is pressed against the stationary workpiece 52 to complete the friction welding.

Referring again to FIGURE 1, this portion of the friction welding cycle is accomplished by starting motor 38 and engaging clutch 42 so that motor 38 drives chuck 31 to rotate workpiece 51. The cylinders 43 are then activated to draw the slide member 26 downward to extend shaft 28 from the hollow shaft 32 and force the rapidly rotating workpiece 51 downward against the stationary workpiece 52. After a suitable time during which sufficient heat is generated, clutch 42 is disengaged and the brake 36 is applied to stop the rotation of workpiece 51. The cylinders 43 continue to urge the now stationary workpieces together to form the weld.

Figure 6:
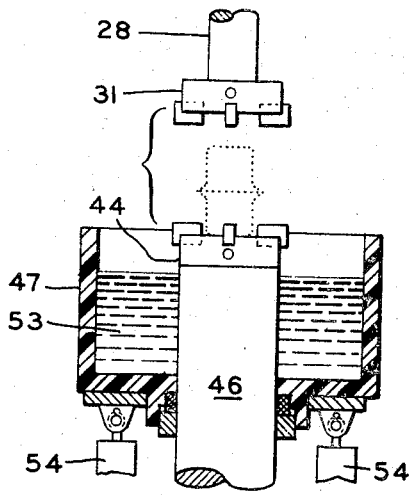
Figure 7:
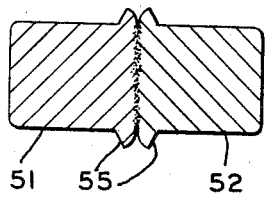
FIGURE 7 is a longitudinal section through two workpieces which have been friction welded.

Referring now to FIGURE 6, the cylinders 54 are activated to lower the flux container 47 and withdraw the level of the fluid 53 below the chuck 44 and the now welded workpieces which are then easily removed from the chucks 31 and 44. If it is desired, the level of the fluid 53 may be withdrawn below the chuck 44 and the workpieces during the welding cycle after the flux has accomplished its purpose. This would be done when it was desirable to avoid any unnecessary cooling of the welding workpieces toward the end of the welding cycle by a liquid fluxing agent. FIGURE 7 shows the two workpieces 51 and 52 after they have been friction welded. Plastic flow from the weld area produces a certain amount of upset 55 which may be very carefully controlled or reduced when friction welding with this apparatus because the liquid fluxing agent may be used to cool the workpieces and control plastic flow adjacent to the weld area for any desired length of time during the early part of the welding cycle.

Referring now to FIGURES 8, 9 and 10, the flux container 47 may be filled with a fluxing agent in powder form such as the flux powder 56. As shown in FIGURE 9, when the flux container 47 is raised about the chuck 44, the fluxing powder 56 will tend to flow between and about the workpieces 51 and 52 prior to their being friction welded. The flow of the granular or powder fluxing agent 56 will be determined by its grain size, grain shape, and other properties and factors. Some fluxing powders may not flow of their own accord to such an extent that they will satisfactorily surround the workpieces 51 and 52. In this case, the powder 56 may be manually urged or blown or spilled about the workpieces 51 and 52, or an electric vibrator 57 may be attached to the flux container 47, immersed in the powder 56, or otherwise brought in contact with the powder 56 to cause it to flow more freely.

As shown in FIGURE 10, a chuck 44 with flat upper surfaces may catch and hold a quantity of the fluxing powder 56. This powder may be removed by manually dusting it from the chuck 44 to fall back into the container 47. However, as shown in FIGURE 10a, a special lower chuck 44' may be provided having a conical upper portion 57 upon which the workpiece 52 rests. The jaws 58 of the chuck 44' may be provided with pointed upper portions 59 or other sloping surfaces. Therefore, when the flux container 47 is lowered about the chuck 44', powder cannot rest upon the chuck 44' and it will automatically fall back into the container 47.

Referring now to FIGURES 11 and 12, if the flux container 47 contains a fluxing agent 60 which is in paste form, the fluxing agent 60, being a paste or a non-Newtonian fluid, will generally not flow about the workpieces 51 and 52 as shown in FIGURE 11. With some pastes, a suitable vibrator 57, as shown in FIGURES 8–10, may cause the pastes to flow about the workpieces. However, as shown in FIGURE 12, two top members 61 and 62 may be placed within the container 47 about the workpieces and forced downward on the paste 60 to cause it to flow between the workpieces.

What is claimed is:

1. The process of friction welding metal workpieces comprising the steps of
   (a) submerging the weld areas of separated workpieces in a fluxing agent and squeezing flux between the workpieces,
   (b) bringing the workpieces together and relatively rotating the workpieces while forcing the workpieces together,
   (c) rapidly stopping the relative rotation of the workpieces while continuing to force them together, and
   (d) removing the welded workpieces from the fluxing agent.

2. The process of friction welding metal workpieces comprising the steps of
   (a) fixing a first workpiece in a vertical position,
   (b) immersing the first workpiece in a fluxing agent,
   (c) rotating and forcing a second workpiece into contact with the first workpiece in the fluxing agent and driving out the fluxing agent from between the workpieces,
   (d) rapidly stopping the rotation of the second workpiece while continuing to force the workpieces together, and
   (e) removing the welded workpieces from the fluxing agent.

3. The process according to claim 2 wherein said fluxing agent is a liquid.

4. The process according to claim 2 wherein said fluxing agent is a powder.

5. The process according to claim 2 wherein said fluxing agent is a paste.

6. Friction welding apparatus for friction welding workpieces submerged in a fluxing agent comprising, in combination,
   (a) a lower workpiece holding chuck,
   (b) a container open at the top and disposed about said lower chuck,
   (c) means raising the level of a fluxing agent within said container above the level of said lower chuck,
   (d) a rotatably mounted vertical upper workpiece holding chuck disposed over said lower chuck,
   (e) means to rotate said upper chuck while forcing said upper chuck towards said lower chuck, and
   (f) means to stop the rotation of said upper chuck rapidly.

7. Friction welding apparatus for friction welding workpieces submerged in a fluxing agent comprising, in combination,
   (a) a lower workpiece holding chuck,
   (b) a substantially vertical lower chuck support having a portion of uniform cross-section,
   (c) a container for a fluxing agent having side walls and a bottom wall disposed about the portion of said chuck support of uniform cross-section, said bottom wall forming a fluid tight seal about said chuck support,
   (d) a fluxing agent within said container,
   (e) means of sliding said container upward about said chuck support until the level of said fluxing agent within said container is above said lower chuck,
   (f) a rotatably mounted vertical upper workpiece holding chuck disposed over said lower chuck,
   (g) means to rotate said upper chuck while forcing said upper chuck towards said lower chuck, and (h) means to stop the rotation of said upper chuck.

8. The combination according to claim 7 wherein said fluxing agent is a liquid.

9. The combination according to claim 7 wherein said fluxing agent is a powder.

10. The combination according to claim 9 with the addition of a vibrator fixed to said container causing said powder to flow.

11. The combination according to claim 10 wherein said lower chuck extends over said chuck support and said lower chuck has upward facing surfaces disposed beyond a workpiece, said upward facing surfaces sloping to throw powder from the upper surfaces of said lower chuck into said container.

12. The process of friction welding metal workpieces comprising the steps of
    (a) raising the level of a fluxing agent relative to the weld areas of workpieces submerging the weld areas of the workpieces,
    (b) relatively rotating the workpieces while forcing the workpieces together,
    (c) rapidly stopping relative rotation of the workpieces while continuing to force them together, and
    (d) dropping the level of the fluxing agent relative to the weld areas of the workpieces at least during the friction welding of the workpieces.

References Cited by the Examiner

UNITED STATES PATENTS

| | | | |
|---|---|---|---|
| 767,465 | 8/04 | Wirth et al. | 113—126 |
| 2,411,439 | 11/46 | Lee | 29—495 X |
| 2,440,698 | 5/48 | Patterson | 29—495 |

FOREIGN PATENTS 572,789 10/45 Great Britain.

OTHER REFERENCES

Friction Welding of Metals, by Vill', June 25, 1959, page 60.

JOHN F. CAMPBELL, *Primary Examiner.*